United States Patent [19]

Fujimura

[11] Patent Number: 4,676,133
[45] Date of Patent: Jun. 30, 1987

[54] FLAT-ROLLED METAL PRODUCT CUTTING APPARATUS

[76] Inventor: Mitsutoshi Fujimura, 14-13 Mitsusadadai 2-chome, Yawata-nish-ku, Kitakyushu City, Fukuoka Prefecture, Japan

[21] Appl. No.: 784,313

[22] Filed: Oct. 4, 1985

[30] Foreign Application Priority Data

Apr. 3, 1984 [JP] Japan ................... 59-67086

[51] Int. Cl.$^4$ ............................................. B26D 1/44
[52] U.S. Cl. ................................... 83/497; 83/499; 83/503
[58] Field of Search ............... 83/496, 497, 499, 503, 83/506, 502, 508.2

[56] References Cited

U.S. PATENT DOCUMENTS

| | | | |
|---|---|---|---|
| 703,213 | 6/1902 | Parcells | 83/496 |
| 2,003,049 | 5/1935 | Hull | 83/496 |
| 2,439,794 | 4/1948 | Bugatti | 83/497 |
| 3,080,783 | 3/1963 | Knepshield | 83/499 |
| 3,612,367 | 10/1971 | Benz | 83/496 |

FOREIGN PATENT DOCUMENTS 429900 10/1974 U.S.S.R. .................... 83/496

*Primary Examiner*—Frank T. Yost
*Assistant Examiner*—Hien H. Phan
*Attorney, Agent, or Firm*—Cushman, Darby & Cushman

[57] ABSTRACT

A flat-rolled metal product cutting apparatus comprises a support installed at the side of the travel line of a flat-rolled metal product, a first and a second chock attached to the support to rotatably support an arbor of a first and a second rotary knife, and a first and a second circular rotary knife, each having the shape of a cylinder or truncated cone, attached near the front end of each arbor. The two rotary knives are disposed in such a manner that the circular knife edges of the two rotary knives meet at the cutting point, with a slight clearance left therebetween, and the axis of rotation of one rotary knife is inclined in a plane containing the axes of rotation of the two rotary knives and also that two planes each containing the axis of rotation of each rotary knife and the cutting point are inclined with respect to each other. The paired circular rotary knives of the flat-rolled metal product cutting apparatus makes a cut along the length of the flat-rolled product that travels forward.

7 Claims, 8 Drawing Figures

FLAT-ROLLED METAL PRODUCT CUTTING APPARATUS

BACKGROUND OF THE INVENTION

1. Field of the Invention

This invention relates to an apparatus for cutting flat-rolled metal products such as metal plate, sheet and strip that makes cuts along the length of a moving flat-rolled metal product employing paired circular rotary knives.

2. Description of the Prior Art

Among the metal strip cutting apparatuses are rotary shears or side trimmers consisting of a pair of circular rotary knives that are disposed parallel to each other. Side trimmers are used to establish uniform strip width by continuously cutting off the edges of a strip throughout the entire length thereof, when the strip does not have a uniform width in an as-rolled state.

In actual operation, considerably large amounts of strip edge material, frequently exceeding twice the strip thickness, must be cut off because of instable variations in constraint, widthwise movement, flatness and other conditions of the strip. A big problem here is high percentages of scrap generation. On the other hand, the great progress in the shape control technology of strip rolling mills, which has been particularly remarkable in recent years, has made it possible to obtain uniform width throughout except in a few limited portions where broader strip width results from unusual rolling operations. Here arises the need to perform intermittent cutting operations to remove the excess width in such limited portions. However, the technologies to remove such desired amount from strip edges as is smaller than strip thickness (hereafter called extra-narrow-width cutting) and to intermittently remove localized excess width (hereafter called localized cutting) are still incomplete. The following problems will arise if an attempt is made to carry out the extra-narrow-width and localized cutting operations using a conventional side trimmer:

(a) Under a loose restraint, a strip tends to escape from the rotary knives when the cutting operation begins slipping thereover to create surface forces acting both widthwise and lengthwise. Particularly when the strip edges are rounded, the escape from the strip is so pronounced that the rotary knives cannot secure a good bite. Consequently, extra-narrow-width and localized cuttings are difficult to accomplish.

(b) If a strip is thoroughly restrained widthwise and the rotary knives are allowed to achieve a forcible bite, the strip tends to buckle and undergo resulting deformation. If extra-narrow-width cutting is performed under this condition, undesirable burrs will result and produce rough edges.

(c) The shape and flow of scrap are unstable so that the collection of scrap becomes difficult.

As such, conventional side trimmers are still widely used to continuously remove the unwanted width, which is larger than strip thickness, from both edges of a strip throughout the whole length thereof.

SUMMARY OF THE INVENTION

This invention provides solutions to the aforementioned problems with the conventional metal strip cutting apparatuses. The object of this invention is to provide a flat-rolled metal product cutting apparatus that is capable of cutting off a portion of the width of a flat-rolled product which is smaller than the thickness thereof from each edge of the flat-rolled product without damaging the sheared edge surface and also to perform an intermittent localized cutting operation only where excess width exists.

A flat-rolled metal product cutting apparatus according to this invention comprises a supporting means installed beside the line over which a flat-rolled product travels, a first and a second chock mounted in the supporting means to rotatably support a first and a second rotary knife arbor, respectively, and a first and a second rotary knife, having a shape of either a cylinder or a truncated cone, attached near the tip of each arbor. At the point where cutting is performed, the circular knife edges of the two rotary knives meet, with a slight clearance left therebetween, in order to avoid mutual interference between the two rotary knives and to secure the optimum cutting condition. The two rotary knives are arranged in such a manner that the axis of rotation of one rotary knife is inclined in a plane containing the axes of rotation of the two rotary knives and also that two planes each containing the axis of rotation of each rotary knife and the cutting point are inclined with respect to each other.

In a flat-rolled metal product cutting apparatus of the above construction, a pair of circular rotary knives makes cuts along the length of a moving flat-rolled product.

The cutting apparatus according to this invention prevents the escape and deformation of a flat-rolled product no matter what shape and condition its edges may have even when high-speed cutting is performed under loose restraint, as is commonly the case in actual operation, because the tilted secondary rotary knife pulls the flat-rolled product toward the scarp side. Even in extra-narrow-width cutting, no significant burring occurs, resulting in the production of good sheared edge surface and the stabilization of the direction in which scrap flows out. As will be understood from the above, application of tension across the width of the flat-rolled product improves the cutting condition and thereby permits the cutting off of a width smaller than the flat-rolled product thickness and the localized cutting operation, which are the object of this invention, to be accomplished.

Because no interference occurs between the flat-rolled product and the rotary knife edges, the edge life is substantially comparable to that of a paralleled set of interference-free square knives employed by conventional trimmers.

The cutting apparatus of this invention drastically reduces the amount of excess width to be cut off from the strip and, as a consequence, achieves a distinct improvement in the yield of the strip.

The principle of this invention is also applicable to the kind of strip edge preparation for welding that is accomplished by use of rotary knives.

DESCRIPTION OF THE PREFERRED EMBODIMENTS

Figure 1:
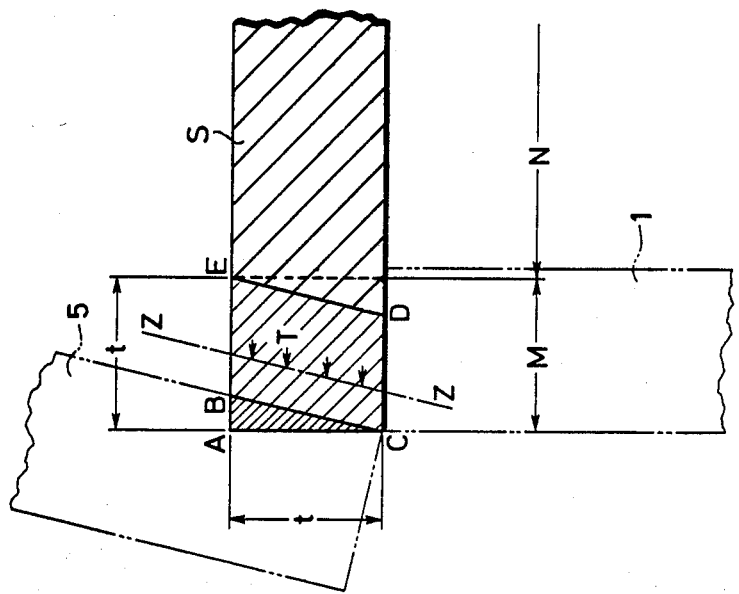
FIG. 1 is a cross-sectional view showing an edge of a flat-rolled product being cut.

FIG. 1 shows a cross section of an edge of a strip being cut. The cut made by a metal strip cutting apparatus of this invention runs along an oblique straight line z—z. A triangle triangular portion ABC to be cut off is now called a delta cut-off region, while a parallelogram BCDE is to be cut off an extra-narrow-width cut-off region. In FIG. 1, reference character t designates strip thickness, M an extra-narrow-width cut-off region, N a cut-off region whose width is not smaller than strip thickness, and T a tension exerted across the width of the strip.

In the delta cut-off region, a first rotary knife constitutes a plane that receives the cutting reaction force while a second rotary knife functions as a planning tool that planes off the desired amount of scrap while exerting a tension T across the width of the strip.

In the extra-narrow-width cut-off region, a second rotary knife bites into the strip while exerting a widthwise tension T after the edges of the two rotary knives came in contact with the surface of the strip. Then, when the cutting force has exceeded the shear strength of the strip, cracks occur and grow along a straight line connecting the edges of the two knives until they meet to accomplish the shearing-off of the strip. Thus, the metal strip cutting apparatus according to this invention is of the double function-type that makes a cut by planing in the delta cut-off region and by shearing in the extra-narrow-width region.

Figure 2:
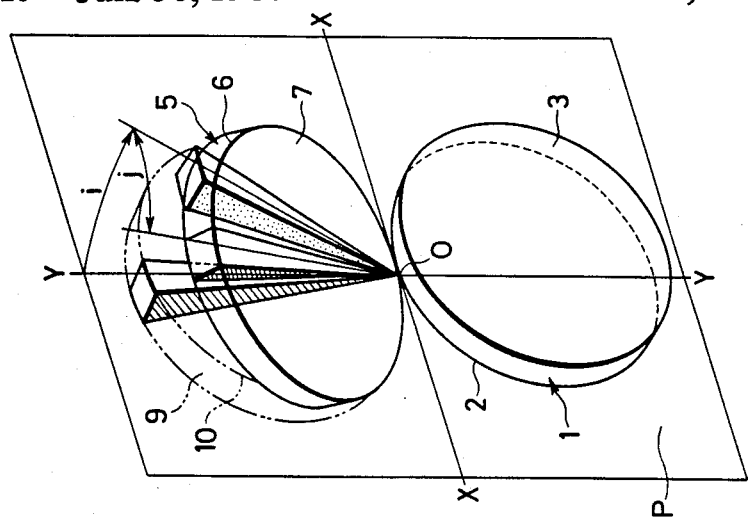
FIG. 2 is a perspective view illustrating the arrangement of rotary knives in a flat-rolled metal product cutting apparatus according to this invention.

Referring now to FIG. 2, the arrangement of the first and second rotary knives will be described in the following.

A straight line X—X intersects orthogonally with a straight line Y—Y at a point O. The straight lines X—X and Y—Y are contained in a plane P.

The metal strip cutting apparatus according to this invention comprises a pair of circular rotary knives 1 and 5.

The first rotary knife 1 is placed in such a position that the circular edge 2 thereof lies in the plane P and contacts the straight line X—X at the point O (the cutting point).

To facilitate the description of the position and posture of the second rotary knife 5, the reference position thereof is indicated by a dot-dash line 9. When placed in the reference position 9, the circular edge 10 of the second rotary knife 5 lies in the plane P, contacts the straight line X—X at the point O and is symmetrical to the first rotary knife 1 about the point O.

In actual practice, the first rotary knife 5 is tilted away from the reference position 9 by an angle i about the straight line X—X in the direction shown in FIG. 2. (The angle through which the knife is tilted is hereafter called the angle of inclination.) Then, the second rotary knife 5 which has been tilted through the angle i is now rotated through an angle j about the straight line Y—Y, either in the direction shown in FIG. 2 or in the opposite direction. (The angle through which the rotary knife is rotated is hereafter called the toe-in angle.) For convenience of illustration, the second rotary knife 5 in the figure is partly cut open to show the ultimate position thereof. As a consequence, the side 7 of the edge of the second rotary knife 5 is tilted and twisted with respect to the side 3 of the cutting edge of the first rotary knife 1. Namely, the two rotary knives are arranged in such a manner that the axis of rotation of one rotary knife is inclined in a plane containing the axes of rotation of the two rotary knives and also that planes each containing the axis of rotation of each rotary knife and the cutting point are inclined with respect to each other.

At the cutting point O, a slight clearance is left between the circular edges of the two rotary knives 1 and 5. The clearance is, for example, over 0 mm and not larger than 1 mm when strip having a thickness of 1.2 mm to 6 mm is to be cut.

In order that the second rotary knife 5 achieves a good bite and exerts tension across the width of the strip, the angle of inclination 1 is chosen from the range between 1 degree minimum and 45 degrees maximum, preferably between 5 degrees and 15 degrees.

Also for the second rotary knife 5 to achieve a good bite and avoid interference with the strip, the toe-in angle j is chosen from the range between 0.1 degree minimum and 12 degrees maximum, preferably between 0.3 degree and 5 degrees.

Figure 5:
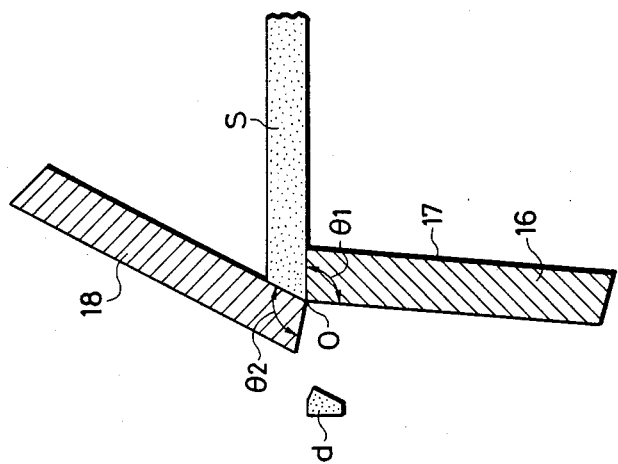
FIG. 5 is a cross-sectional view of a preferred embodiment in which a first rotary knife is installed in such a manner as to tilt outward or at an obtuse angle with the flat-rolled product surface.
Figure 4:
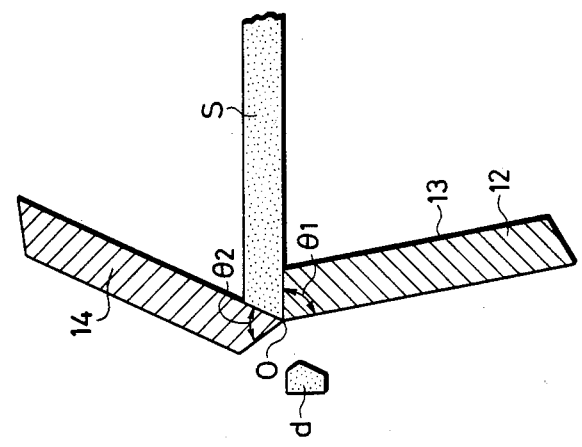
FIG. 4 is a cross-sectional view of a preferred embodiment in which a first rotary knife is installed in such manner as to tilt inward or at an acute angle with the flat-rolled product surface.
Figure 3:
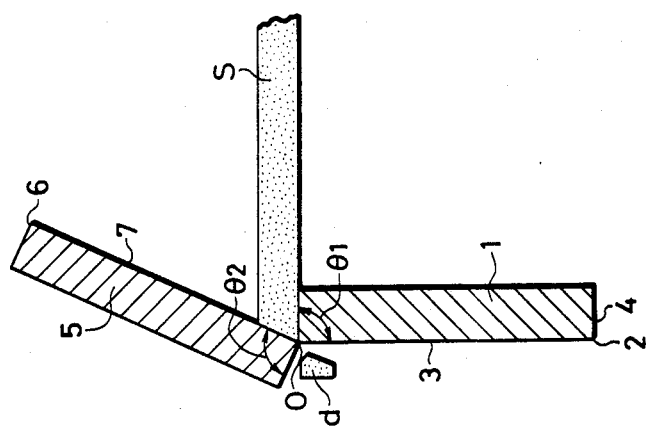
FIG. 3 is a cross-sectional view of a preferred embodiment in which a first rotary knife is installed perpendicular to the flat-rolled product surface.

FIGS. 3 to 5 show other preferred embodiments of the rotary knives.

FIG. 3 shows a preferred embodiment in which the first and second rotary knives 1 and 5 are cylindrical in shape, with the cutting edges thereof squared to an angle $\theta_1$ and $\theta_2$ of 90 degrees. While the peripheral surface 4 of the first rotary knife 1 contacts the under surface of an edge of the strip S, the inner surface 7 of the second rotary knife 5 contacts the edge of the strip S. Reference character d denotes a piece of scrap cut off from the strip S.

FIG. 4 shows a preferred embodiment whose first and second rotary knives 12 and 14 both have a configuration of truncated cone. The cutting edges of the two knives 12 and 14 are both tapered to acute angles $\theta_1$ and $\theta_2$. With the rotary knives each shaped like a truncated cone, greater cutting ability and smaller surface indentation, formed by the contact of the knives with the strip, result.

FIG. 5 shows a preferred embodiment whose first and second rotary knives 16 and 18 each have the shape of a truncated cone as with the preferred embodiment in FIG. 4. The rotary knives 16 and 18 in FIG. 5 differ from those in FIG. 4 in that the cutting edges thereof are machined to obtuse angles $\theta_1$ and $\theta_2$ and the first rotary knife 16 is leaned in different direction.

Alternatively, one of the rotary knife edges may have an acute angle and the other an obtuse angle.

Although the two rotary knives are disposed in the same relative positions in all of the above embodiments, the surface 3 of the first rotary knife 1 in FIG. 3 is perpendicular to the surface of the strip S while the surfaces 13 and 17 of the first rotary knives 12 and 16 in FIGS. 4 and 5 are not perpendicular thereto. The latter arrangement brings about the following effects:

(a) The strip can be drawn closer to the cut-off scrap to any desired extent by adjusting the inclination of the first rotary knife with respect to the surface of the strip.

(b) The obtuse cutting edge lengthens the life of the knife.

(c) A round cut of small curvature is achieved by adjusting the clearance between the two knives.

(d) The angle of the cutting edge can be chosen freely depending upon the quality of the strip to be cut.

A side trimmer is an example of the metal strip cutting apparatus comprising a set of rotary knives disposed as described above. The function of the side trimmer is to cut off the desired amount from both edges of cold-rolled strip to establish uniform width and proper configuration. Now a side trimmer will be described by reference to FIGS. 6 to 8.

Figure 6:
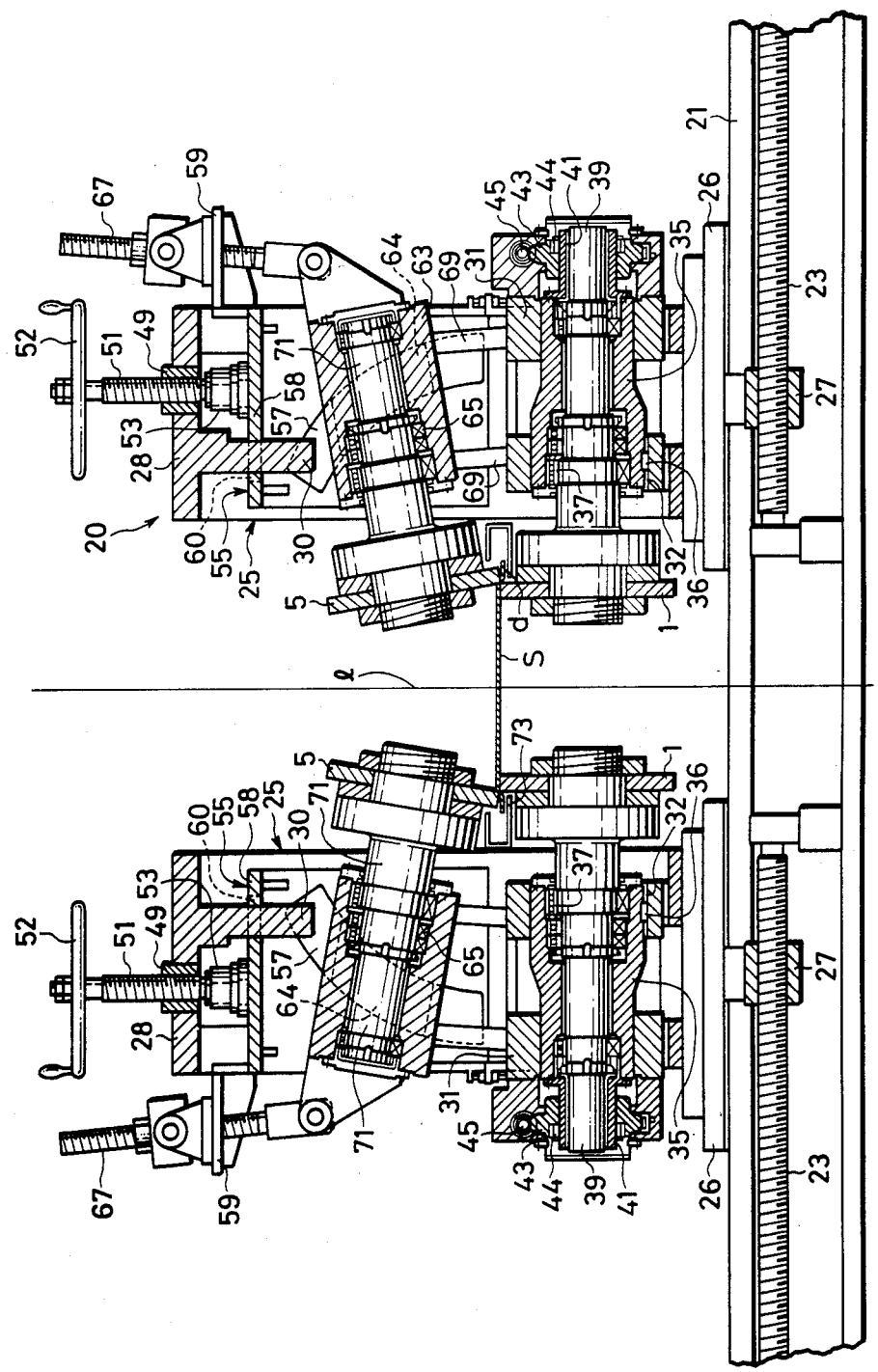
FIG. 6 is a partially cross-sectional front view of a preferred embodiment of a metal strip cutting apparatus equipped with rotary knives.
Figure 7:
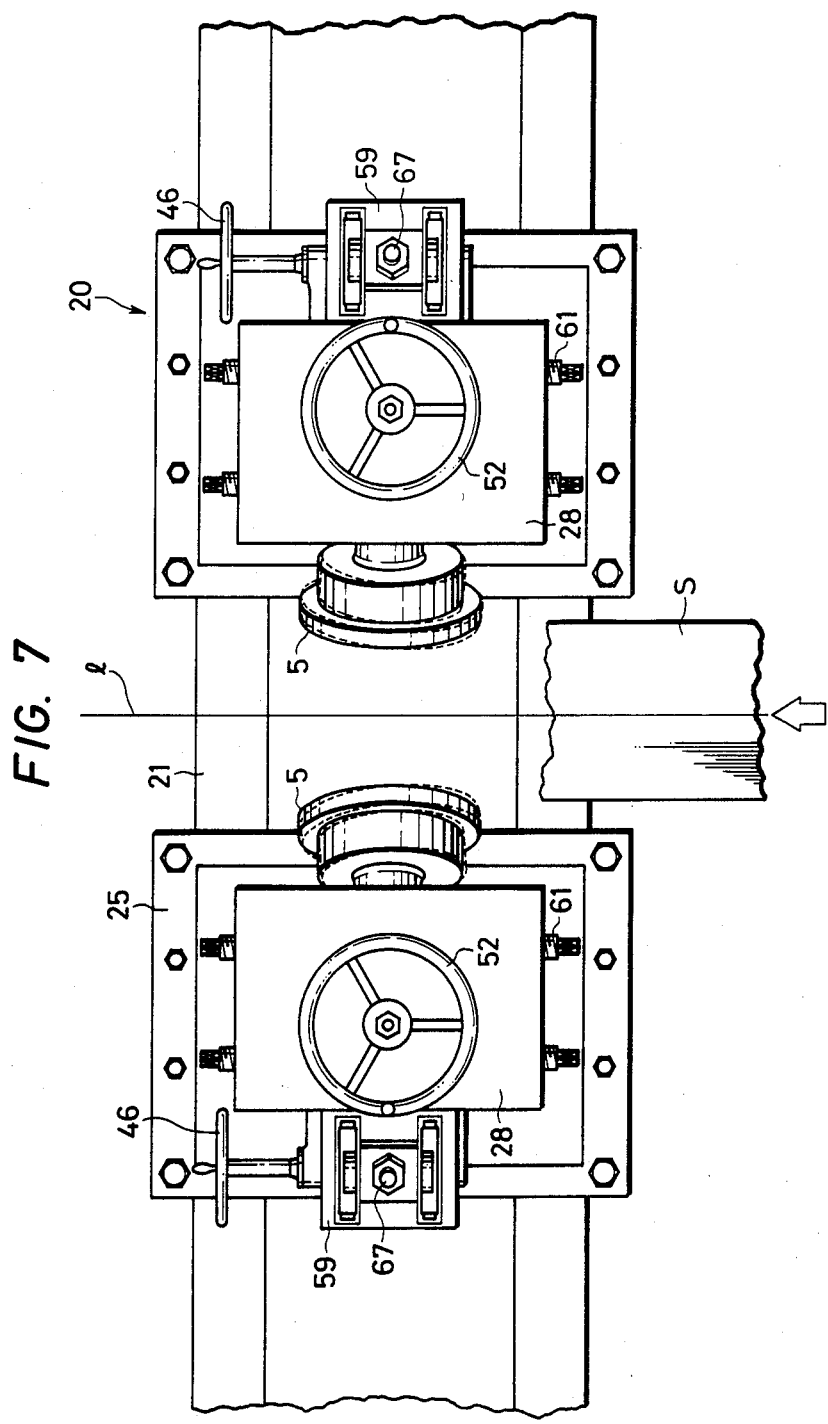
FIG. 7 is a plan view of the metal strip cutting apparatus shown in FIG. 6.
Figure 8:
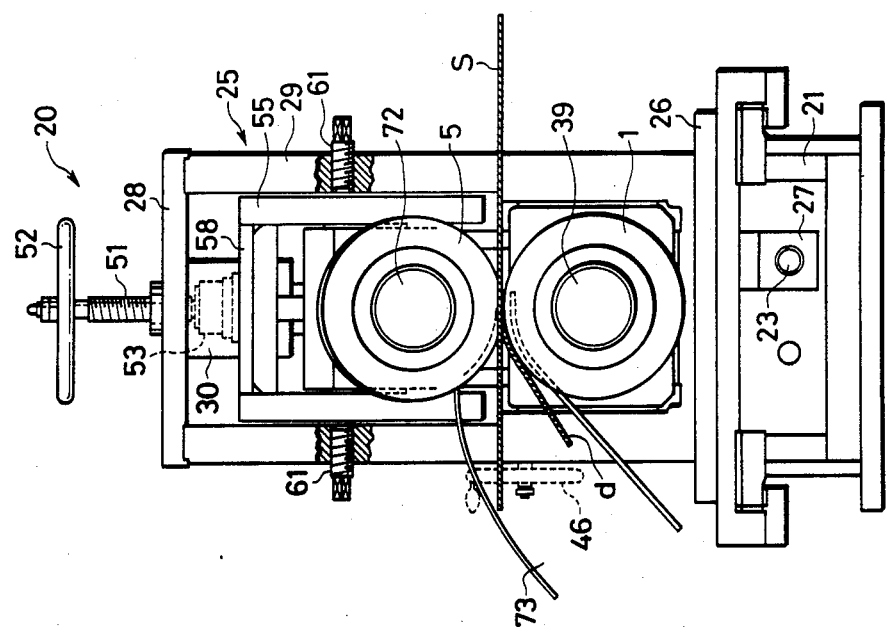
FIG. 8 is a side elevation of the same metal strip cutting apparatus.

FIGS. 6 to 8 respectively and front view, a plan view and a side elevation of a side trimmer.

As shown in FIG. 6, a bed 21 extends across the center line l of a strip, with a pair of movable housings mounted thereon, one opposite to the other, on both sides of the center line l in such a manner as to be slidable along the bed 21. A threaded feed bolt 23 extending along the base 21 is passed through a nut 27 provided under the foundation 26 of each housing so that the housing 25 is moved bacn and forth with respect to the center line l when the feed bolt 23 is turned either by a motor (not shown) or manually.

A guide 31, which has a keyway 32 cut in the front end thereof, is fastened on the foundation 26 of the housing 25. By fitting a key 36 in the keyway 32, a lower chock 35 is reciprocatably inserted in the guide 31. The lower chock 35 supports through a bearing 37 an arbor 39 that carries a first rotary knife 1 near the front end thereof. A threaded sleeve 41 is attached to the rear end of the lower chock 35. One the other hand, a worm wheel 43 is rotatably fitted to the guide 31 with a thread 44 cut on the inner surface of the worm wheel 43 mating with said threaded sleeve 41. The worm wheel 43 engages with a worm 45 supported by the guide 31, so that the arbor 39 of the first rotary knife is moved back and forth by the manipulation of a handle 46 fastened to the worm 45.

A threaded bush 49 is provided at the top 28 of the housing 25 and an adjusting screw 51 is fitted therein. A movable frame 55 is coupled to the lower end of the adjusting screw 51 through a sliding joint 53 in such a manner as to be movable in all directions in a horizontal plane. The adjusting screw 51 moves up and down the movable frame 55. Spaced-away toe-in angle adjusting screws 61 are screwed into the front and rear of the vertical walls 29 of the housing 25, with the forward end of each toe-in angle adjusting screws 61 being brought into contact with one side of the movable frame 55. When the toe-in angle adjusting screw 61 in the front and rear are screwed in to different depths, the movable frame 55 rotates in a horizontal plane. Because the projection 30 is fitted in the toe-in angle adjusting groove 60 as described before, the movable frame 55 rotates thereabout to adjust the toe-in angle j.

An arched inclination-angle adjusting groove 57 is provided on the vertical wall 56 of the movable frame 55 to accommodate a projection 64 of an upper chock 63. Guided along the inclination-angle adjusting groove 57, the upper chock 63 tilts about the cutting point O. an inclination angle adjusting screw 67 is attached to a bracket 59 mounted on the top 58 of the movable frame 55, with the lower end of the adjusting screw 67 connected to the rear end of the upper chock 63. The movable frame 55 is supported afloat in the housing 25 by means of hydraulic jacks 69. An arbor 71 is supported by the upper chock 63 through a bearing 65, with a second rotary knife 5 attached near the front end thereof. The angle of inclination of the arbor 71, i.e., the angle of inclination i of the second rotary knife 5, is adjusted by an inclination angle adjusting screw 67.

The following paragraphs describe the operation of a side trimmer 20 of the above-described construction by which both edges of a strip S are trimmed to establish uniform width.

To begin with, the feed screw 23 is manipulated to adjust the space between the two side trimmers 20 according to the width of the strip S to be trimmed. The handle 46 is then operated to move back and forth the lower chock 35 for fine adjustment of the position of the first rotary knife 1. After putting the first rotary knife 1 in right position, the inclination angle i and toe-in angle j of the second rotary knife 5 is adjusted by means of the inclination angle adjusting screw 67 and toe-in angle adjusting screw 61. The handle 52 is operated to lower the movable frame 55, thus bringing the edges of the two rotary knives 1 and 5 into contact. At this time the pressure of the hydraulic jacks 69 is properly adjusted. The adjusting screw 51 depresses the movable frame 55 against the thrust exerted by the hydraulic jacks 69. As a consequence, the upper chock 63 is secured to the housing 25 so firmly that the second rotary knife 5 in no case departs from the cutting point O under the influence of the cutting reaction forces.

After the two rotary knives 1 and 5 have been properly positioned as described above, the strip S pulled by a tension reel or other similar means is forcibly passed through between the paired side trimmers 20. On passing therethrough, both edges of the strip S are trimmed off as described previously, with the resulting scrap being collected through a chute 73.

Now, an example of the cutting operation performed by the above-described side trimmers will be described. The cutting conditions employed were as follows:

Grade of Strip Steel: Plain carbon steel
Strip thickness: 1.2 to 4.5 mm
Rotary knife diameter: 380 mm
Knife edge angle $\theta_1$: $45° \leq \theta_1 \leq 135°$
Knife edge angle $\theta_2$: $45° \leq \theta_2 \leq 135°$
Angle of inclination i: $1° \leq i \leq 45°$
Toe-in angle j: $0.1° \leq j \leq 12°$
Cutting speed: 500 to 400 m/min Even as small an excess width as 1 mm minumum was successfully removed from both edges of the strip by intermittent trimming, thereby attaining uniform strip width. The trimming operation caused no deformation at the edges of the strip. Nor did it produce any burr on the trimmed surfaces.

When the strip width changed, the clearance betwen the two rotary knife edges was adjusted to the new width without stopping the travel of the strip.

This invention is in no way limited to the preferred embodiments described above. For example, the position and posture of the two rotary knives may be fixed when they are employed for cutting a strip of uniform width. Also, the two rotary knives may be driven by a motor, as opposed to the above-described preferred embodiments in which the knives are freed while the strip travels forward. Furthermore, the arbors of the first and second rotary knives may be attached to the housing in an inclined and a horizontal position, respectively.

What is claimed is:

1. A flat-rolled metal product-cutting apparatus for cutting a flat-rolled metal product which has an upwardly-presented surface and which is moving along a travel line, using a pair of circular rotary knives disposed one on top of the other, comprising:

a horizontal supporting means extending perpendicularly to said travel line of said flat-rolled product;

a housing mounted on said supporting means in such a manner as to be movable back and forth therealong;

means for moving said housing back and forth along said supporting means;

a movable frame attached to said housing by attachment means in such a manner as to be both rotatable in a horizontal plane and elevatable;

means for adjusting the vertical position of said movable frame;

means for adjusting the angular disposition of said movable frame in said horizontal plane;

a lower circular rotary knife mounted on an arbor adjacent a forward end of such arbor;

a lower chock attached to said housing in such a manner as to rotatably support said arbor of said lower rotary knife and so as to be movable back and forth perpendicularly to said travel line of the flat-rolled product;

means for moving said lower chock back and forth with respect to said housing;

an upper circular rotary knife mounted on an arbor adjacent a forward end of such arbor;

an upper chock attached to said housing by attachment means in such a manner as to rotatably support said arbor of said upper rotary knife and so as to be tiltable to have a tilting angle with respect to said surface of said flat-rolled product;

means for adjusting said upper arbor for changing said tilting angle of said upper chock with respect to said surface of said flat-rolled product;

said upper rotary knife having a planar cutting face which faces axially of the respective arbor, and a radially outer peripheral surface which meets said cutting face at a circular cutting edge;

said lower rotary knife having a planar face which faces axially of the respective arbor and a radially outer peripheral cutting surface which meets said face of said lower rotary knife at a circular cutting edge;

said cutting face of said upper rotary knife being inclined with respect to a first imaginary plane which is both perpendicular to said surface of said flat-rolled product and parallel to said travel line;

said cutting face of said upper rotary knife also being inclined with respect to a second imaginary plane which is both perpendicular to said surface of said flat-rolled product and perpendicular to said travel line; and said upper and lower rotary knives being so arranged that said circular cutting edges of said upper and lower rotary knives nearly meet at a cutting point, with a slight clearance remaining between them.

2. The flat-rolled product-cutting apparatus of claim 1, wherein:

said cutting face of said upper rotary knife including the respective said cutting edge being inclined with respect to said first imaginary plane at an angle of from 1 degree to 45 degrees, and being inclined with respect to said second imaginary plane at an angle of from 0.1 degree to 12 degrees.

3. The flat-rolled metal product-cutting apparatus of claim 1, wherein:

said cutting face and said outer peripheral surface of said upper rotary knife intersect at the respective said circular cutting edge at an included angle of substantially 90 degrees; and said face and said outer peripheral cutting surface of said lower rotary knife intersect at the respective said circular cutting edge at an included angle of substantially 90 degrees.

4. The flat-rolled metal product-cutting apparatus of claim 1, wherein:

said cutting face and said outer peripheral surface of said upper rotary knife intersect at the respective said circular cutting edge at an included angle which is an acute angle; and said face and said outer peripheral cutting surface of said lower rotary knife intersect at the respective said circular cutting edge at an included angle which is an acute angle.

5. The flat-rolled metal product-cutting apparatus of claim 1, wherein:

said cutting face and said outer peripheral surface of said upper rotary knife intersect at the respective said circular cutting edge at an included angle which is an obtuse angle; and said face and said outer peripheral cutting surface of said lower rotary knife intersect at the respective said circular cutting edge at an included angle which is an obtuse angle.

6. The flat-rolled metal product-cutting apparatus of claim 1, wherein:

said cutting face and said outer peripheral surface of said upper rotary knife intersect at the respective said circular cutting edge at a first included angle; and said face and said outer peripheral cutting surface of said lower rotary knife intersect at the respective said circular cutting edge at a second included angle; and one of said first and second included angles is an acute angle and the other of said first and second included angles is an obtuse angle.

7. The flat-rolled metal product-cutting apparatus of claim 1, wherein:

said attachment means which attach said movable frame to said housing comprise a sliding joint which permits said movable frame to be rotated in a horizontal plane relative to said housing; and said attachment means which attaches said upper chock to said housing comprises a hydraulic jack.

* * * * *